(12) United States Patent
Mayer

(10) Patent No.: US 11,507,050 B2
(45) Date of Patent: Nov. 22, 2022

(54) MILLING METHOD

(71) Applicant: exeron GmbH, Oberndorf a. N. (DE)

(72) Inventor: Joachim Mayer, Oberndorf a. N. (DE)

(73) Assignee: exeron GmbH

( * ) Notice: Subject to any disclaimer, the term of this patent is extended or adjusted under 35 U.S.C. 154(b) by 0 days.

(21) Appl. No.: 17/258,554

(22) PCT Filed: Jul. 3, 2019

(86) PCT No.: PCT/EP2019/067869
§ 371 (c)(1),
(2) Date: Jan. 7, 2021

(87) PCT Pub. No.: WO2020/011623
PCT Pub. Date: Jan. 16, 2020

(65) Prior Publication Data
US 2021/0149368 A1    May 20, 2021

(30) Foreign Application Priority Data

Jul. 9, 2018   (DE) .................... 10 2018 116 553.6

(51) Int. Cl.
*G05B 19/4093*     (2006.01)
*B23C 3/00*        (2006.01)

(52) U.S. Cl.
CPC .......... *G05B 19/40937* (2013.01); *B23C 3/00* (2013.01); *G05B 2219/34175* (2013.01); *G05B 2219/49077* (2013.01)

(58) Field of Classification Search
None
See application file for complete search history.

(56) References Cited

U.S. PATENT DOCUMENTS 9,815,125 B2    11/2017   Uenishi

FOREIGN PATENT DOCUMENTS

| | | |
|---|---|---|
| DE | 102010060220 A1 | 5/2012 |
| DE | 102015112577 A1 | 2/2016 |
| JP | 2017001153 A | 1/2017 |

(Continued)

OTHER PUBLICATIONS

Anonymous, "Fraesen mit hoher Prazision", Technische Rundschau. Hallwag, Bern; CH, DE, vol. 100, No. 15, Aug. 8, 2008, with English Abstract, 3 pages.

(Continued)

*Primary Examiner* — Sean Shechtman
(74) *Attorney, Agent, or Firm* — RatnerPrestia

(57) ABSTRACT

The invention relates to a method for machining a workpiece by means of a milling tool arranged on a rotatable spindle, the spindle being moved relative to the workpiece or the workpiece being moved relative to the spindle along a machining path and, at the same time, the spindle rotating about a spindle axis. In said method, an improvement in the surface quality is achieved by controlling the rotational speed and/or the phase position of the rotation of the spindle along the machining path, the machining path comprising linear parallel tracks and the phase position of the spindle along the machining path being substantially the same on adjacent tracks, the phase position being controlled by varying the rotational speed of the spindle and/or the advancing speed of the spindle relative to the workpiece along the machining path.

11 Claims, 4 Drawing Sheets

(56) References Cited

FOREIGN PATENT DOCUMENTS

WO 2017056025 A1 4/2017

OTHER PUBLICATIONS

Carstens, J., "Frasen mit Sinumerik-Formenbau von 3-bis 5-Achsen Simultanfrasen" ip.com Journal, ip.com Inc., West Henrieta, NY, US, with partial English translation, Nov. 23, 2011, 132 pages.
International Preliminary Report on Patentability for International Application No. PCT/EP2019/067869, dated Jan. 12, 2021, 12 pages.
International Search Report and Written Opinion for International Application PCT/EP2019/067869, dated Nov. 18, 2019, 11 pages.

MILLING METHOD

CROSS REFERENCE TO RELATED APPLICATIONS

This application is a U.S. National Phase Application of PCT International Application No. PCT/EP2019/067869, filed Jul. 3, 2019, which claims benefit of priority from German Patent Application No. 10 2018 116 553.6, filed Jul. 9, 2018. The contents of these applications are incorporated herein by reference.

TECHNICAL FIELD

The present invention relates to a method for machining a workpiece with a milling tool arranged on a rotatable spindle, wherein the spindle is moved relative to the workpiece or the workpiece is moved relative to the spindle along a machining path and the spindle rotates about a spindle axis, wherein a rotational speed and/or a phase position of the rotation of the spindle along the machining path is controlled, as well as a device and a computer program for carrying out the method and a data structure for coding the computer program.

BACKGROUND ART

In modern machine tools, numerical controls are used to control the positioning and movement of tools relative to a workpiece. In order to machine a workpiece according to a specification, it is necessary to move the tool relative to the workpiece on predetermined paths. This is therefore also referred to as path control. The desired paths are defined in a part program which is executed by the numerical control. The numerical control converts the geometric instructions of the part program into instructions to the position control of the various feed axes of the machine tool. During the milling process, the milling spindle driving the tool is usually operated at a technologically constant speed, which is specified in the part program. (S-word according to DIN 66025). Likewise, a path speed is programmed in the part program for the tool (F word according to DIN 66025), which usually refers to the TCP (tool center point) or to the point of tool engagement on the tool.

Generic milling processes are known, for example, from DE 10 2015 112 577 A1, DE 10 2010 060 220 A1, WO 2017/056025 A1 or JP 2017-001153 A1.

If surfaces produced by milling are produced by "trimming", there are several reasons why the cutting-edge interactions of the tool are arbitrarily shifted in their phase position relative to each other in adjacent milling paths on the workpiece. For example, the spindle position is not exactly coupled to the path feed (e.g., with a speed-controlled spindle), or the path length integral in adjacent milling paths is not a multiple of the tooth feed (offset even with a given positional coupling between feed axes and spindle).

In addition, there is a variation of the feed rate, for example in rapid traverse for positioning or feed rate reduction during reversal. At constant spindle speed, this means that the synchronicity between path parameters and spindle position is lost. When a programmed feed rate is reached again, the angular position of the spindle is practically random.

As a result, milling workpieces manufactured according to the state of the art typically show irregular linear surface structures as shown in FIG. 8. In FIG. 8 the toolpaths run from left to right. You can see how the points of contact of the tool edges in adjacent toolpaths are randomly synchronized. Sometimes, however, shifts occur, which then lead to an optically uneven appearance (wider stripes) of the surface. In the case of tools for injection molding or the like, this structure can be transferred to the end product.

DISCLOSURE OF THE INVENTION

Technical Problem

An objective of the present invention is to provide a method which makes it possible to produce a phasing of the tool cutting edge interactions in adjacent toolpaths in a targeted manner. In particular, an objective is to improve the surface quality.

Technical Solution

The problem is solved in particular by a method for machining a workpiece with a milling tool arranged on a rotatable spindle, wherein the spindle is moved relative to the workpiece or the workpiece is moved relative to the spindle along a machining path and the spindle rotates about a spindle axis in the process, wherein a rotational speed and/or a phase position of the rotation of the spindle along the machining path is controlled and wherein the machining path comprises linear parallel paths. The machining path comprises line-shaped parallel paths arranged side by side and the phase position of the spindle is the same or substantially the same along the machining path in adjacent paths. Due to the same phase position, the pattern introduced into the surface by the milling process is the same in adjacent paths so that the optical impression of a uniformly machined surface is created. The surface texture therefore makes it possible to do without polishing the surface.

The phase position is controlled by varying the rotational speed of the spindle and/or the feed rate of the spindle relative to the workpiece along the machining path.

The speed and/or the phase position is controlled in an embodiment of the invention along the processing path at at least one synchronous point to a predetermined desired value.

The speed and/or the phase position may be controlled in embodiments of the present invention along the processing path at several synchronous points to a respective predetermined set value.

Before reaching a synchronous point, in embodiments of the present invention, the control of speed and phase position to the setpoint may be started at a trigger point.

In embodiments of the present invention, the phase position may be controlled by reducing or increasing the spindle speed. Thus, without changing the feed rate, the phase position of the spindle can be controlled by regulating the spindle speed alone.

In embodiments of the present invention, the phase position may be controlled by lowering or increasing the feed rate of the spindle relative to the workpiece along the machining path. In this variant an intervention in the feed is used to synchronize the phase position.

In embodiments of the present invention, the phase position may be shifted by a multiple of the pitch of the cutting edges of a milling tool with several cutting edges. Instead of focusing on full revolutions of the spindle, i.e. the angle in the range 0° to 360° (or angle modulo 360°), the phase is synchronized to individual cutting edges. For example, if the milling head has 10 cutting edges, synchronization can be performed every 36° (360°/10).

The problem mentioned above is also solved by a device for carrying out a process according to the invention, which comprises means for displacing a workpiece relative to a milling tool arranged on a spindle and means for controlling the speed and phase of the rotation of the spindle.

In embodiments of the present invention, the spindle may be driven by a position-controlled electric motor. In embodiments of the invention, the device may comprise means for determining the angular position of the spindle.

The problem mentioned above is also solved by a computer program for carrying out a process according to the invention and a data structure for coding a computer program for carrying out a process according to the invention.

BRIEF DESCRIPTION OF THE DRAWINGS

Examples of how the invention was implemented are explained in more detail below using the enclosed drawings. Show thereby.

MODES FOR CARRYING OUT THE INVENTION

NC (numerical control) programs describe the milling path in a sequence of simple geometric elements. Support points or path support points are the respective boundaries between two subsequent geometry elements. These coordinates are taken from the NC program per line as NC block. The path parameter (also called path length integral) describes exactly one point on the path described in the part program, which may well lie between the support points of the NC blocks In the following, a synchronous point is understood to be any point of the path (=path parameter) at which simultaneously applies:

nSpdl=nprog (the spindle speed is at the value specified in the program)

vb=vprog (the feed rate is at the value specified in the program)

φSpdl=φprog (the angular position (phase) of the spindle is at the value specified in the program)

aSpdl=0 (the spindle speed is constant)

ab=0 (the spindle is not accelerated in x, y, z direction)

A trigger point is the start (in time and/or path parameters) for planning a motion profile towards a synchronous point.

By programming a feed rate and a spindle speed in an NC program of a CNC control, a technologically conditioned tooth feed rate is determined. It is the task of every CNC to maintain this programmed (desired or maximum) feed rate as accurately as possible without exceeding this maximum value, while maintaining the dynamic limit values of the axes involved. In areas of path curvature, the feed level must be lowered in order not to dynamically overload the axis feed drives or to meet certain requirements for path accuracy. This is realized by the pre-calculation of a so-called speed limit profile within the so-called path planning, as shown in FIG. 1.

Figure 1:
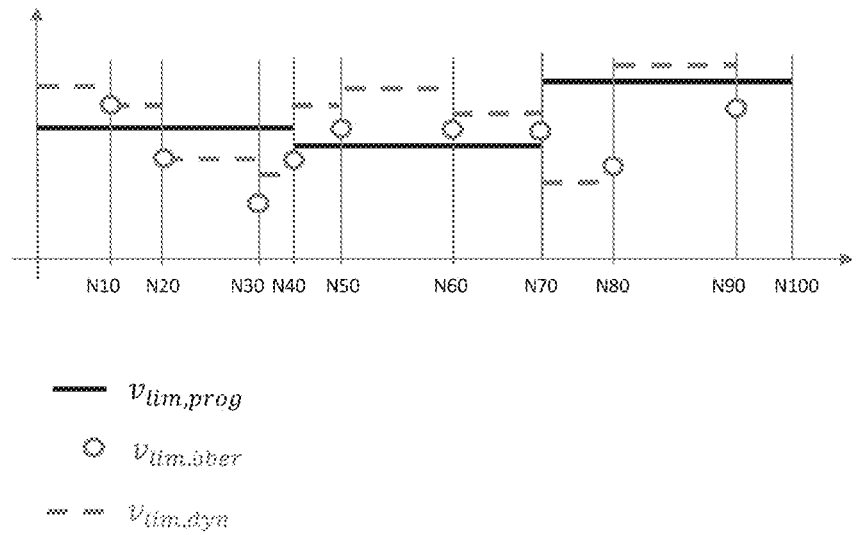
FIG. 1 is a sketch of a speed limit profile as a result of the path planning.

In FIG. 1 and in the following text, each program line is designated N10, N20 and so on up to N100 in accordance with the DIN/ISO or G code. For each program line, a state-of-the-art CNC control system determines a maximum feed speed as a speed limit value profile for path planning. The speed limit value profile contains the feed rate or feed speed $v_{lim, prog}$ programmed in the NC program and, as a result of the path analysis, the dynamically conditioned maximum values for the path speed within the block $v_{lim, dyn}$ as well as the maximum transition speed per block transition $v_{lim}$.

Figure 2:
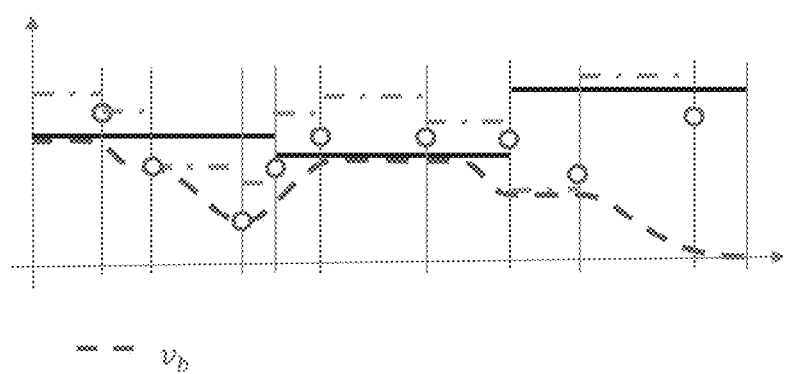
FIG. 2 is a sketch of a speed limit profile as an approximation to the limit profile from below.

The task of the downstream so-called velocity profile generator is to compute a velocity profile over the path parameter (or time, depending on the implementation), which follows the minimum values of the limit profile from below, i.e. from lower values, since the maximum value must not be exceeded. If a representation over time is chosen, the velocity profile results in 2nd order polynomial segments, whose segment boundaries in the most general case neither lie exactly on a sentence boundary nor on a point in time, which is later sampled by the interpolator, as shown in FIG. 2. The speed vB is at any point below the values of $v_{lim, prog}$, $v_{lim, dyn}$ and $v_{lim, über}$, shown in FIG. 1 above.

Figure 3:
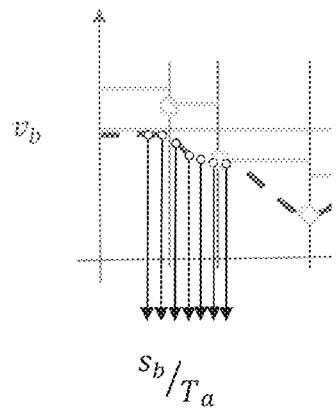
FIG. 3 is a sketch of a sampling of the path velocity profile in the interpolation cycle.

Finally, the velocity profile thus precalculated is sampled by the so-called sampling interpolator in the cycle time of the so-called interpolation take as IPO sampling points and the position setpoints for all feed axes involved in the movement are calculated. This also means that not every NC support point is output to the axis controller as an exact position setpoint, because the exact NC block limit is generally located between two IPO scan points. The scanning is shown schematically in FIG. 3. With a time interval Ta, position values sb are determined by corresponding position sensors of all axes and transmitted to the controller.

The determination of the speed profile shown above and the resulting control of the feed rates of all axes are known from the state of the art.

The speed curve of a position-controlled spindle is determined and controlled by the path of the spindle. In addition, the angle (phase) of the spindle is controlled to a predetermined value at certain points. A graphic representation is based on that of the path speed profile.

Figure 4:
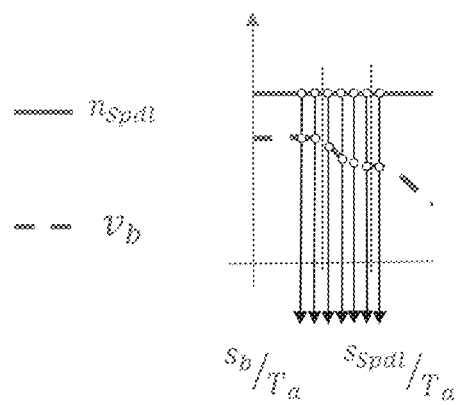
FIG. 4 is a sketch of joint sampling of the path velocity profile and a spindle velocity profile in the interpolation cycle.

The velocity of a position-controlled spindle can be ingeniously represented as a path velocity profile in the same representation of a velocity plot over the path parameter (or time) as shown in FIG. 4. The cyclical position setpoints can then be sampled from both profiles simultaneously.

By such a procedure, each interpolated path point is assigned exactly one spindle orientation (i.e. an angle of the spindle relative to a zero point; one phase of the rotation of the spindle). In particular, there is a "quasi-gear synchronicity" between spindle speed and path speed in the areas of constant path feed and constant spindle speed. However, in the state of exact speed coupling between spindle and path for the spindle there is still the degree of freedom of the spindle orientation in relation to the path length integral, which can be mathematically understood as an integration constant. According to the invention, this degree of freedom is provided with target parameters (=programmed) and produced in a time-optimized manner while maintaining the dynamic limits.

For the supply of the target parameters an exact spindle orientation is assigned at at least one point on the path. According to the invention, this assignment takes place particularly advantageously in the NC program. The programming of such a synchronization condition leads to a fixed spindle orientation at least (FIG. 5) once per adjacent milling path. With given synchronization commands, the task of the procedure according to the invention is first to determine whether trajectory planning is possible while maintaining the dynamic limit values. If trajectory planning is possible, two possible methods for establishing synchronicity are described below. Furthermore, a procedure is given how to deal with the case that trajectory planning is not possible.

For the following explanations, it is assumed that the system properties of the CNC control system are given (or will be produced first):

According to the invention, a specific geometric location on the path is assigned a spindle angular position desired at this point. In execution examples of the invention, this is realized by adding an additional NC block base to the part program in the CNC program (possibly redundant to the pure path description). Here is an example of one (of many conceivable) syntax extension of a DIN/ISO-compliant NC program, this is inserted in line N40 with "G119 S77" and explained there as a comment:

N10 M03 S1000
N20 G00 X-110 Y0 Z10
N30 G01 Z-1 F2000
N40 G01 X-100 G119 S77; at position X-100 the spindle should be at 77°.
N50 G01 X+100

The syntax extension provides a G119 command which expects a parameter S with the specification of an angular position of the spindle relative to a zero point (phase position).

This results in a "quasi-gear synchronism" between the path length integral and the angular position of the milling spindle at constant feed rate and constant spindle speed. In practice, this requirement is probably best met by position-controlled operation of the milling spindle.

Under the boundary condition that the limits of the three derivatives of the path according to time (vmax, amax, jmax) are kept for all feed axes and the milling spindle, there is a minimum time (and thus also a minimum path on the milling path) required to reach a synchronous point for each movement state of the path axes and the milling spindle. Conversely, this means that it is not physically possible to establish any desired synchronization in any short time or distance. Therefore, the procedure to be described must also explain what happens in such cases.

In contrast to linear feed axes, the cumulative position of the milling spindle since the beginning of its movement is of no interest for the present task. Only the angular positions within the 0 . . . 360° modulo range are of interest. This means that the maximum phase compensation required for the milling spindle to achieve the synchronization target is $$\Delta\varphi_{max} = +/-180°/\text{No. of cutting edges}$$

A further special feature for the position-controlled operation of spindles with setpoint specification in the module area is that each setpoint position can be reached in two ways (forward or backward rotation.) If the information about the direction of rotation is known, the position specification works up to 360°/TA. In other words, with an interpolation cycle of 1 ms, up to 60,000 rpm spindle speed.

If trajectory planning is possible, two methods can be used.

In the first process, the spindle performs a phase compensation. The definition of a synchronous point shows that synchronous points can only be located at such geometric locations on the path (path parameters), in which a constant feed rate is achieved. According to the definition of the nestling problem explained above, such synchronous points can lie exactly on a block boundary if the braking or acceleration distance on the path is sufficient to comply with the condition ab=0 at block entry in addition to vb=vprog, and if this braking or acceleration distance or its duration is also sufficient to establish the necessary phase compensation of the spindle.

Such a case is shown in the following diagram:

. . . N10 M03 S1000
:
N30 G00 X5 Y0 Z-5 F2000
N40 G00 X10 Y10 Z-1
N50 G00 X15 Y5
N60 G01 X85
N70 G01 X100 Y90 Z-2 F1500 G119 S77; Synchronize spindle to 77
N80 G01 X150

The individual program lines are marked as before with N10, N20 and so on. In addition to the path to X=100, Y=90 at a depth position Z=−2 and a feed rate of 2000, program line N70 contains the information that the spindle should assume an angle of 77° there.

Figure 5:
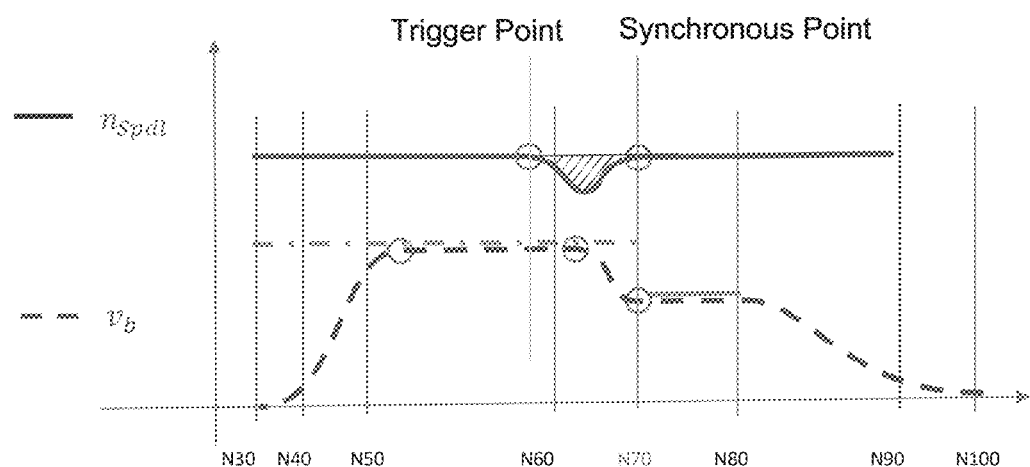
FIG. 5 is a sketch of spindle phase compensation towards a block limit.

The area created in FIG. 5 is the speed-time integral corresponding to the required phase correction of the spindle position. The respective segment boundaries of the velocity profiles are encircled. In this case, the movement is time-optimized without affecting the feedrate planning and without any negative influence on the total machining time of the part program. To calculate the synchronization process, proceed as follows: After a (new) NC block with orientation conditions for the spindle is found in the look-ahead buffer, the spindle speed profile is recalculated in addition to the path speed profile, similar to the way a "normal" new NC block is entered.

Since the look-ahead process runs in real time with the speed profile generation in the interpolator, the position setpoint output to the spindle in the last cycle is known, as well as the exact path parameter and thus also the duration (in path travel and time) until the synchronous point is reached. This allows the angular position of the spindle at the synchronous point to be calculated if the machine were to continue without correction of the spindle speed. The required amount of phase compensation is then the difference between these two angular positions in the modulo circle. In the case of multi-blade tools, the required phase compensation can of course also be shortened to 360°/angular positions. With knowledge of the dynamic limit values of the spindle, a spindle speed profile can then be calculated which establishes the synchronization point exactly at the block limit If the path feed (as in our example) is not constant during the phase correction of the spindle, it is important that the synchronization process of the spindle ends exactly at the block limit.

Figure 6:
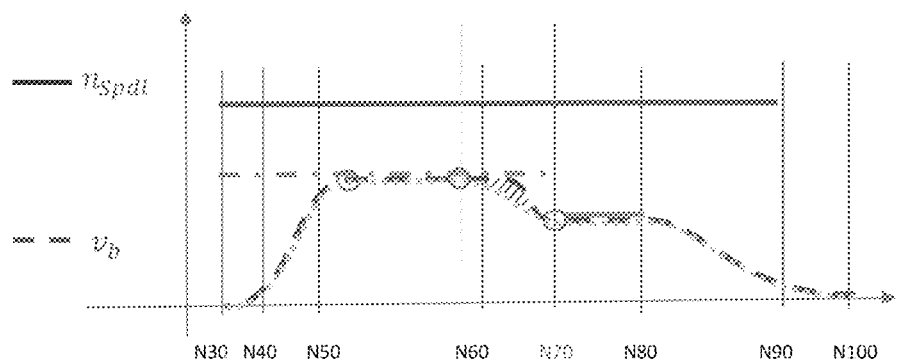
FIG. 6 is a sketch of phase compensation by temporary reduction of the feed level towards a block limit.

In a second execution example of the method according to the invention, phase compensation is achieved by lowering the feed level for a limited time, see FIG. 6.

The method for time-limited reduction of the feed level of the speed profile is particularly efficient for high-speed spindles. The required height and duration of the feed rate reduction is low because the spindle can take up practically any angular position within milliseconds without varying the spindle speed. To calculate the synchronization process, proceed as follows: The required phase correction amount is first determined as in the above procedure. After the calculation of the required phase correction up to the synchronous point, a modified piece of velocity profile is calculated towards the synchronous point in such a way that the movement section requires exactly as much additional time (compared to the original planning) as the spindle needs to pass the required phase correction.

Figure 7:
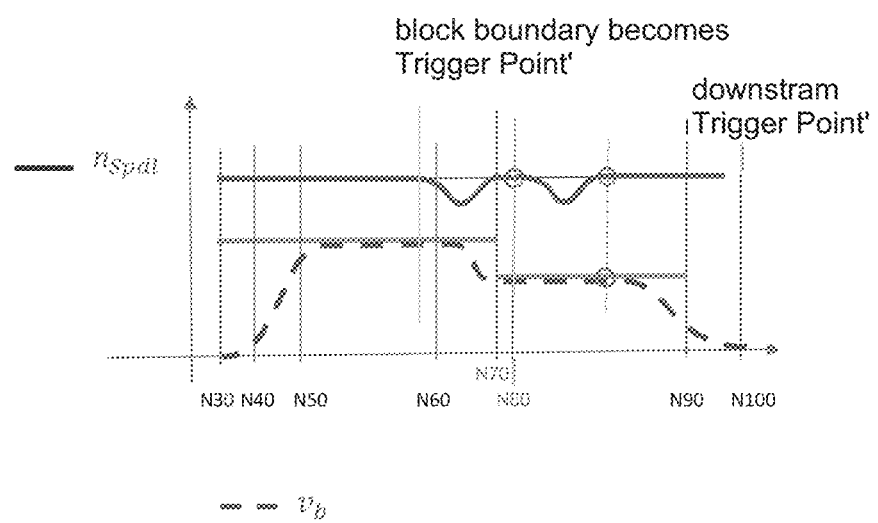
FIG. 7 is a sketch of the downstream phase compensation in case of dynamically impossible trajectory planning to the programmed block boundary.
Figure 8:
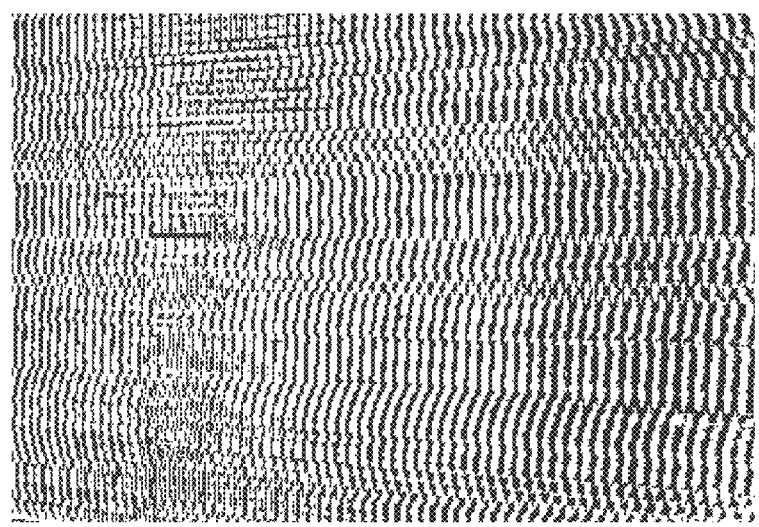
FIG. 8 is a sketch of a surface of a milling workpiece produced with a state-of-the-art milling process.

Trajectory planning is always impossible if there is not enough time or distance to find a trajectory. The procedure according to the invention provides for such a case to determine a downstream synchronous point, which is a certain distance . . . d from the programmed synchronous point (downstream). The selected distance . . . d is an integral multiple of the planned feed rate known from the S and F word. The S word controls the spindle speed, the F word the feed rate. Thus, synchronicity of the tool cutting edge engagement is achieved with a delay, but still defined, to a geometric location programmed in the NC program. With a well-filled look-ahead buffer and NC blocks with synchronous conditions that do not follow each other too closely, this case will probably occur in practice rather rarely or not at all. The easiest way to "provoke" it is to use NC blocks with synchronous conditions that follow each other too closely. The following illustration shows an example of such a case: With a programmed feed level, there is no possibility of changing the orientation of the spindle by 64° within the distance of X 0.1 mm while maintaining the dynamic limit values, see FIG. 7;

. . . N10 M03 S1000
:
N30 G00 X5 Y0 Z-5 F2000
N40 G00 X10 Y10 Z-1
N50 G00 X15 Y5
N60 G01 X85
N70 G01 X100 Y90 Z-2 F1500 G119 S77; Synchronize spindle to 77
N80 G01 X100,1 Y90 Z-2 G119 S13; Synchronize spindle to 13
N90 G01 X150

FORMULA SYMBOLS s Location, Position, Path
v Speed
a Acceleration
j Jerk
φ Angular position
n Speed
TA Interpolation cycle time (IPO clock)

INDEXES b Path, values that refer to the NC path
Spdl Spindle, values that refer to the path
prog (in NC program) programmed value

The invention claimed is:

1. A method for machining a workpiece with a milling tool arranged on a rotatable spindle, the method comprising:
moving the spindle relative to the workpiece or moving the workpiece relative to the spindle along a machining path;
rotating the spindle about a spindle axis; and
controlling the spindle along the machining path such that the machining path comprises linear parallel paths along the workpiece having synchronized spindle control by:
analyzing a portion of the machining path prior to executing the portion of the machining path, the analysis determining a synchronous point along the analyzed portion of the machining path, the synchronous point being a position along the analyzed machining path where a spindle phase is to be the same as a previous spindle phase achieved along at least one of the linear parallel paths, and
prior to reaching the synchronous point, varying the rotational speed of the spindle and/or the feed rate of the spindle relative to the workpiece along the analyzed portion of the machining path to adjust the spindle phase to be the same as the previous spindle phase at the synchronous point.

2. The method according to claim 1, further comprising: controlling the rotational speed and/or the feed rate along the machining path at at least one synchronous point to a predetermined setpoint.

3. The method according to claim 2, further comprising: controlling the rotational speed and/or the feed rate along the machining path at several synchronous points to a respectively predetermined setpoint.

4. The method according to claim 2, further comprising: before reaching a synchronization point at a trigger point, starting the controlling of rotational speed and feed rate to the setpoint.

5. The method according to claim 1, further comprising: controlling the spindle phase by decreasing or increasing the spindle speed.

6. The method according to claim 1, further comprising: controlling the spindle phase by decreasing or increasing the feed rate of the spindle with respect to the workpiece along the machining path.

7. The method according to claim 1, further comprising: shifting the spindle phase of a milling tool with several cutting edges by a multiple of the pitch of the cutting edges.

8. A device for executing the method in claim 1, the device comprising a means for displacing a workpiece relative to a milling tool arranged on the spindle, and means for controlling the rotational speed and feed rate of the spindle.

9. The device according to claim 8, wherein the spindle is driven by a position-controlled electric motor.

10. The device according to claim 8, wherein the device further comprises a means for determining the angular position of the spindle.

11. A non-transitory computer readable medium having a computer program stored thereon that when executed by a processor performs the method according to claim 1.

* * * * *